Feb. 20, 1968  A. A. NORDGREN  3,370,150
WELDING APPARATUS AND METHOD
Filed July 7, 1965  6 Sheets-Sheet 1
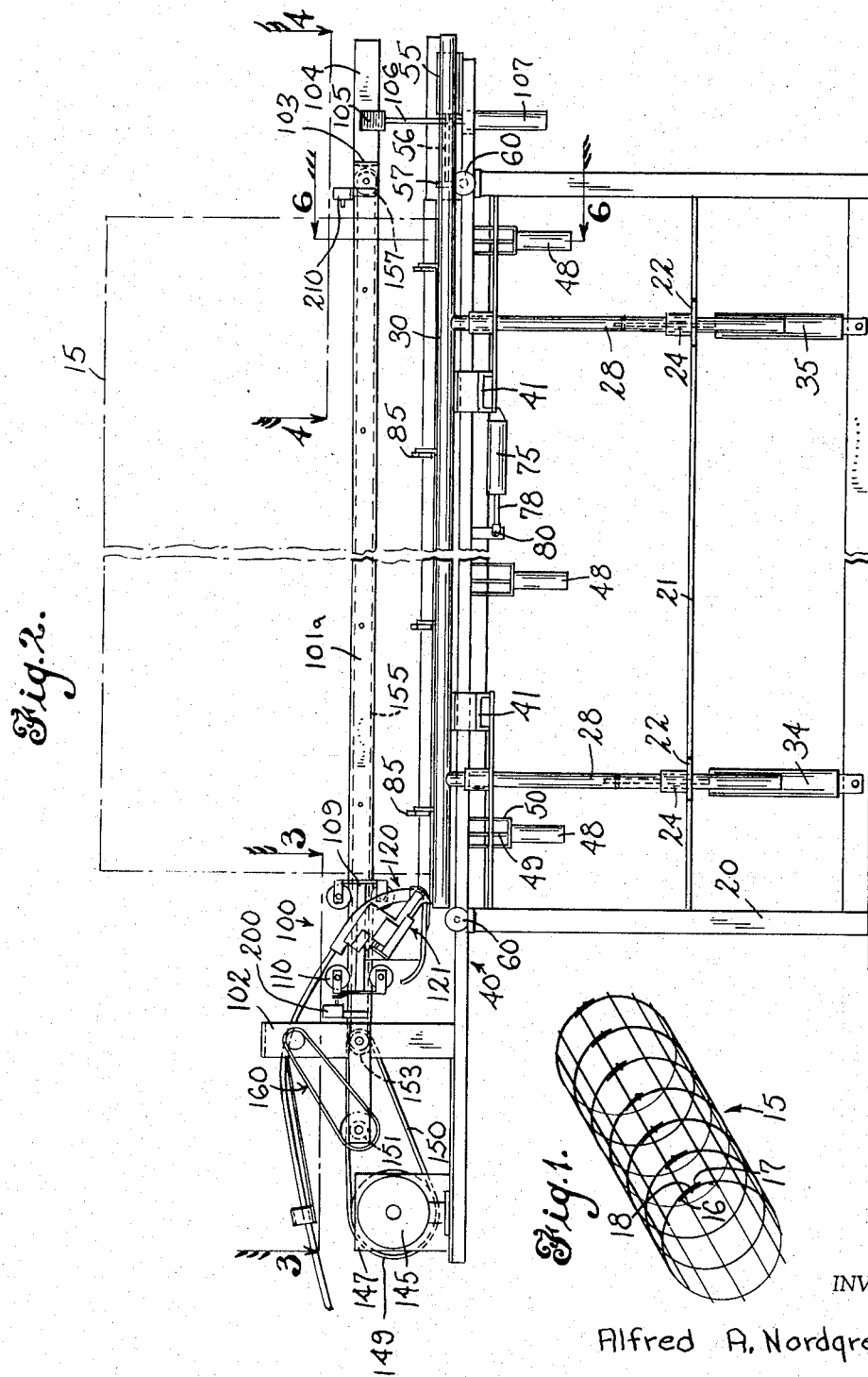
INVENTOR
Alfred A. Nordgren
BY De Lio and Montgomery
ATTORNEYS INVENTOR
Alfred A. Nordgren BY De Lio and Montgomery
ATTORNEYS Feb. 20, 1968  A. A. NORDGREN  3,370,150
WELDING APPARATUS AND METHOD
Filed July 7, 1965  6 Sheets-Sheet 3
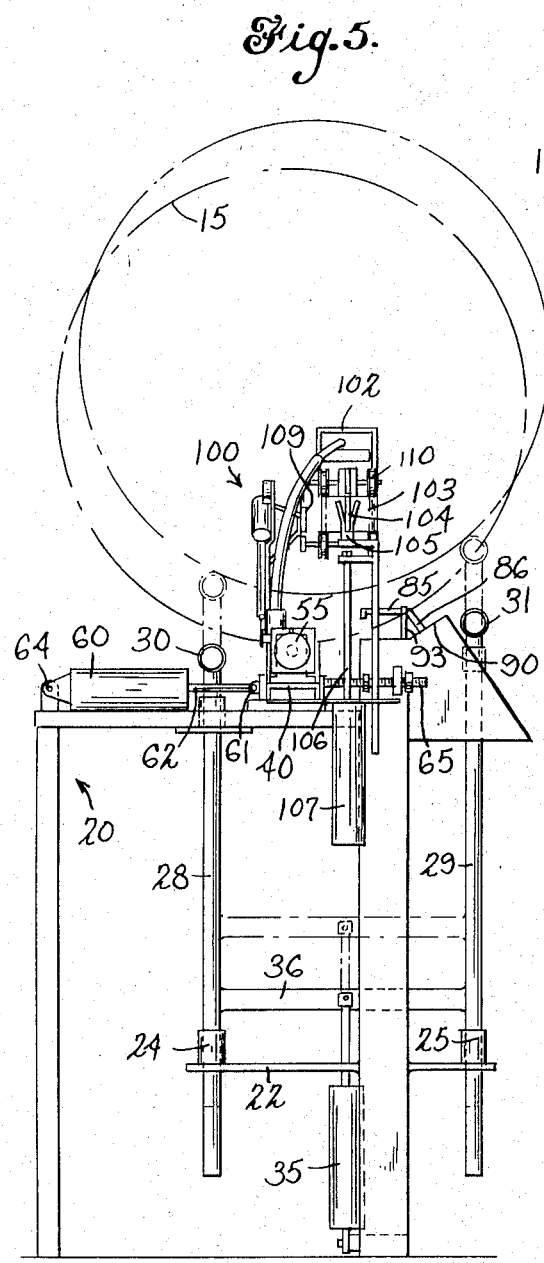
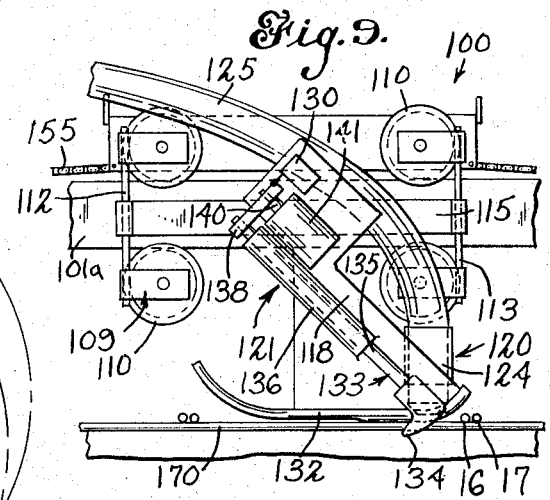
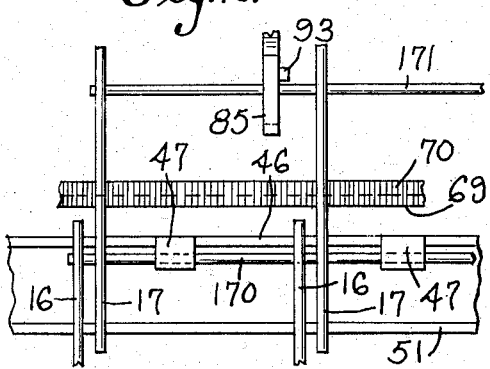
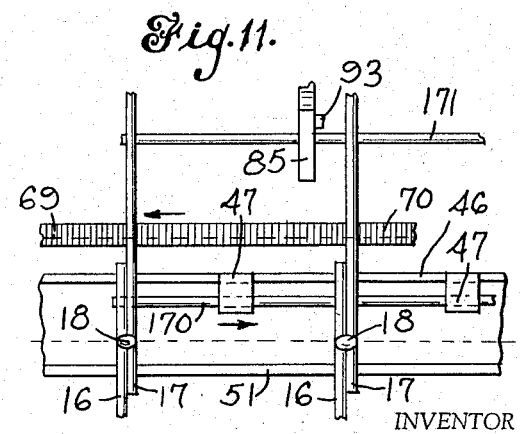
INVENTOR
Alfred A. Nordgren
BY De Lio and Montgomery
ATTORNEYS

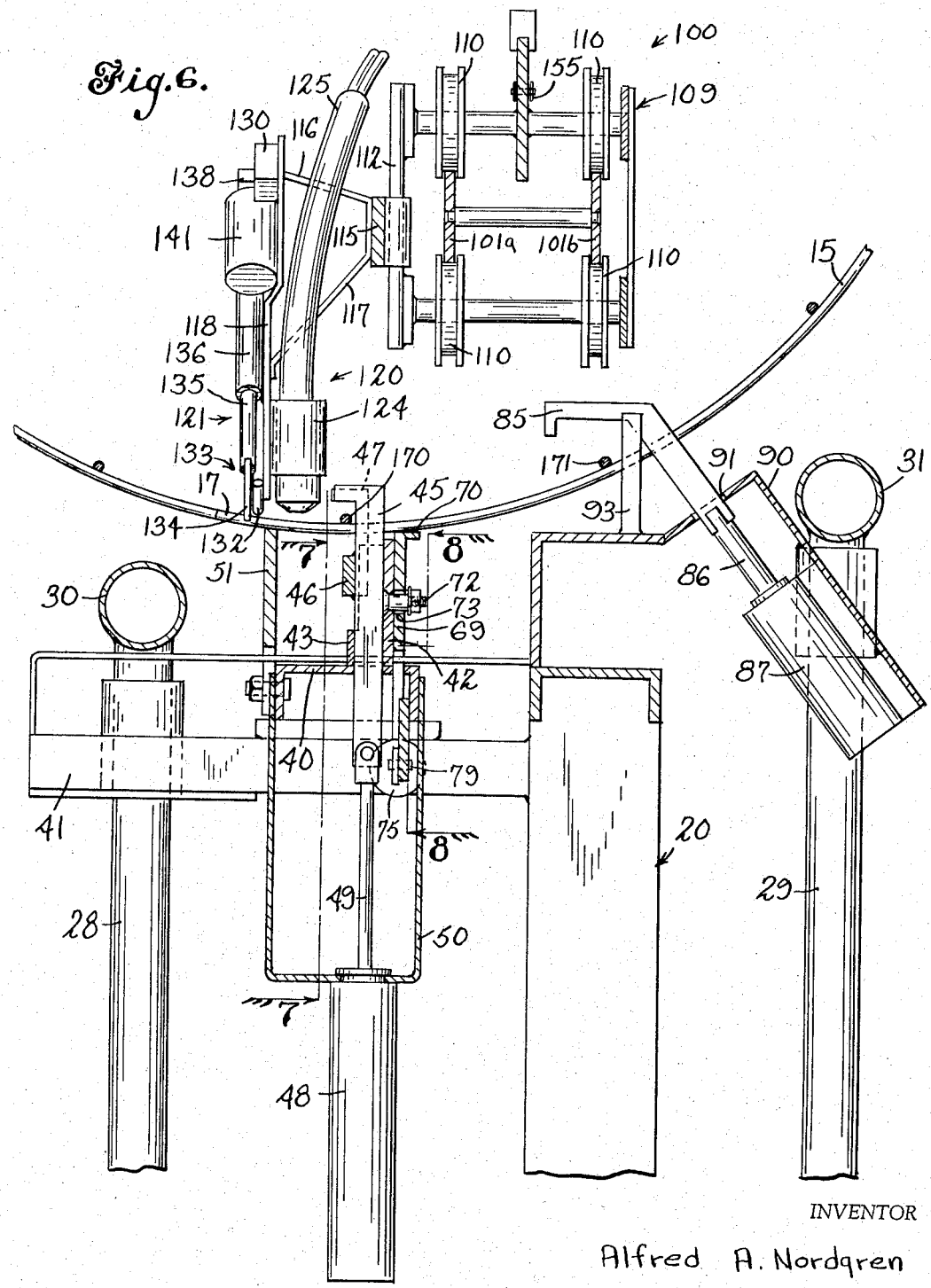

Feb. 20, 1968 A. A. NORDGREN 3,370,150
WELDING APPARATUS AND METHOD
Filed July 7, 1965 6 Sheets-Sheet 5
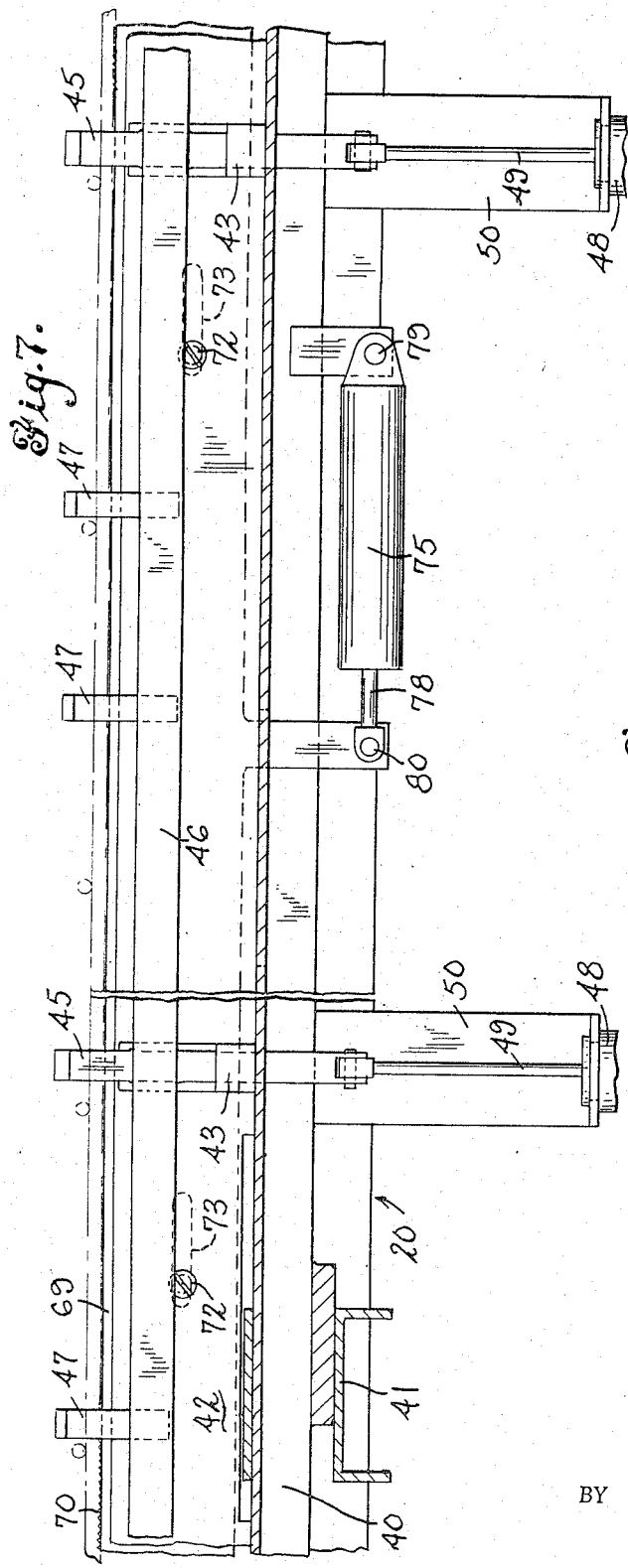
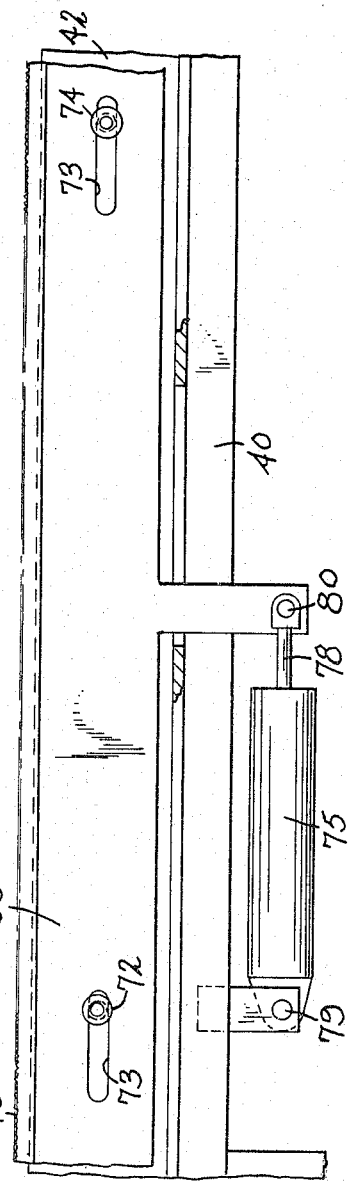
INVENTOR
Alfred A. Nordgren
BY De Lio and Montgomery
ATTORNEYS Feb. 20, 1968  A. A. NORDGREN  3,370,150
WELDING APPARATUS AND METHOD
Filed July 7, 1965  6 Sheets-Sheet 6
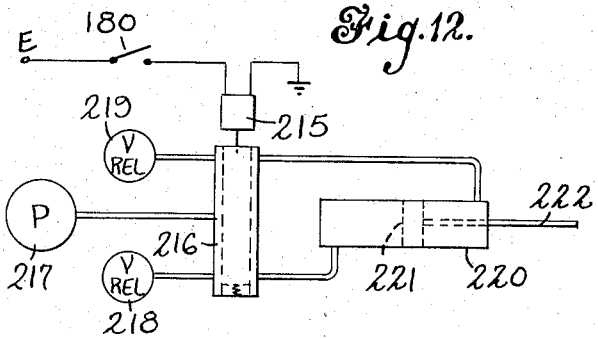
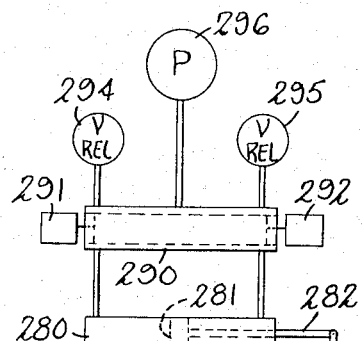
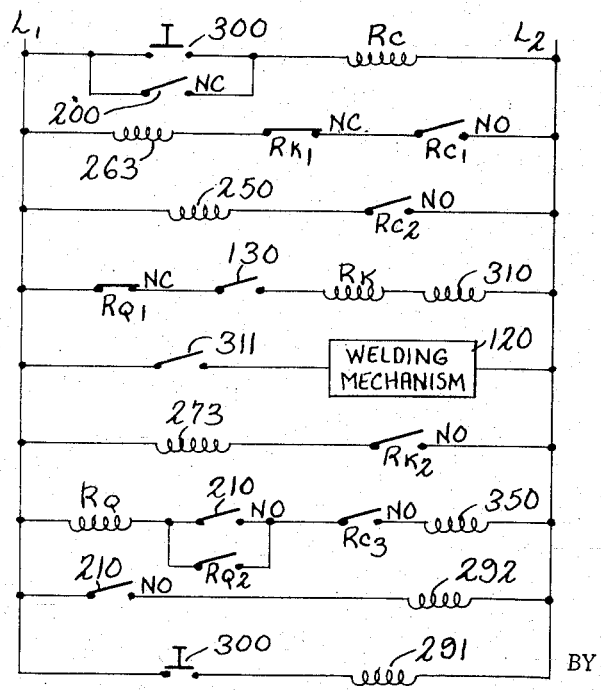
INVENTOR
Alfred A. Nordgren
BY
De Lio and Montgomery
ATTORNEYS

United States Patent Office 3,370,150
Patented Feb. 20, 1968

3,370,150
WELDING APPARATUS AND METHOD
Alfred Alling Nordgren, New Britain, Conn., assignor to The Leonard Concrete Pipe Company, Inc., Hamden, Conn., a corporation of Connecticut
Filed July 7, 1965, Ser. No. 469,986
6 Claims. (Cl. 219—125)

ABSTRACT OF THE DISCLOSURE

Apparatus for welding a section of wire mesh together to form a cage, the section including a plurality of vertical strands each having a pair of free ends and a plurality of cross strands coupled to at least some of said vertical strands and each of the free ends of the vertical strands extending a distance from one of said cross strands positioned nearest the tip of the free ends, said apparatus comprising in combination, means for aligning the free ends of the same vertical strands to contact each other, and automatic means sequentially traveling across each pair of contacting free ends for sequentially welding the free ends of at least some of the same vertical strands together to form the cage, said means for welding including means for sensing the contacting free ends to initiate welding of the free ends.

A method of welding the free ends of the same wire mesh strands of a plurality of wire mesh strands together to form a wire mesh cage, comprising the steps of positioning the free ends of the same strands in contact with each other and against a surface to parallelly align them in a plane in a side-by-side relationship, and moving a welding mechanism rapidly between pairs of contacting free ends, sensing a free end and then slowly moving the welding mechanism across contacting free ends to sequentially weld together each of said ends in contact with each other.

---

This invention relates to welding methods and apparatus and more particularly to methods and apparatus for welding a section of wire mesh material to provide a wire cage.

The invention is of particular importance to the concrete pipe industry and to other industries which require cylindrical wire cages as reinforcement in the formation of other products. For example, in the concrete pipe industry, wire mesh cages are utilized as reinforcement in the construction of concrete pipe for sewage, water systems, and the like.

In order to form the wire mesh cage reinforcement, wire mesh is first cut into lengths having vertical-stranded free ends. The lengths are then formed into cylindrical shapes by passage through a forming apparatus. Subsequent to removal from the forming apparatus, the lengths are welded together at their free ends to form the wire mesh cage.

At present, the welding method utilized to form the cage is completely manual. This mode of operation entails not only a safety hazard to the individuals involved with the welding operation, but also results in an expenditure of a great deal of time and expense to complete the construction of the wire mesh cages.

Accordingly, a new and improved automatic welding apparatus and method was required in order to reduce the safety hazard and costs encountered in welding wire mesh to form wire cages.

In general, the new method involves the clamping of a section of preformed material in place and then sequentially welding parallel ends on opposite sides of the length together to complete the formation of the cage. Additionally, this invention includes apparatus for clamping the cage in place, aligning the ends with respect to each other in a plane in order to insure that a proper weld is formed, and means for sequentially sensing a pair of substantially parallel adjacent ends to initiate the welding of the ends together to complete the construction of a wire cage.

In view of the foregoing, it is an object of this invention to provide a new and improved apparatus for welding wire cages.

Another object of this invention is to provide a new and improved method of welding wire cages.

Another object of this invention is to provide a new and improved apparatus for aligning ends of a wire cage so that a plurality of ends may be sequentially welded.

A further object of this invention is to provide a new and improved apparatus for systematically welding a wire cage.

Still other objects and advantages of the invention will in part be obvious and will in part be apparent from the specification.

The invention accordingly comprises the several steps and the relation of one or more steps with respect to each other and the apparatus embodying features of construction, combinations of elements and arrangements of parts which are adapted to effect such steps, all as exemplified in the following detailed disclosure, and the scope of the invention will be indicated in the claims.

For a fuller understanding of the invention, reference is had to the following description taken in conjunction with the accompanying drawings, in which:

FIG. 1 is a perspective view showing the wire cage formed according to this invention;

FIG. 2 is a side elevational view of the welding apparatus according to this invention;

FIG. 5 is an elevational view of the right end of the welding apparatus according to this invention;

FIG. 6 is a sectional view taken along line 6—6 of FIG. 2 with certain parts not intercepted by sectional line 6—6;

FIG. 7 is a sectional view taken along line 7—7 of FIG. 6;

FIG. 8 is a sectional view taken along line 8—8 of FIG. 6;

FIG. 9 is an enlarged side view of the welding head according to this invention;

FIG. 10 is a diagrammatic illustration showing the ends of the wire cage prior to being forcibly aligned;

FIG. 11 is a diagrammatic illustration showing the ends of the wire cage after they have been aligned and welded;

FIG. 12 illustrates a manual or switch-actuated electrical-pneumatic control system suitable for operating the aligning or other positioning mechanism according to this invention;

FIG. 13 illustrates a hydraulic-pneumatic system suitable for positioning the welding mechanism according to this invention; and FIG. 14 is a schematic diagram of an electrical circuit suitable for controlling the hydraulic-pneumatic system of FIG. 14.

Figure 3:
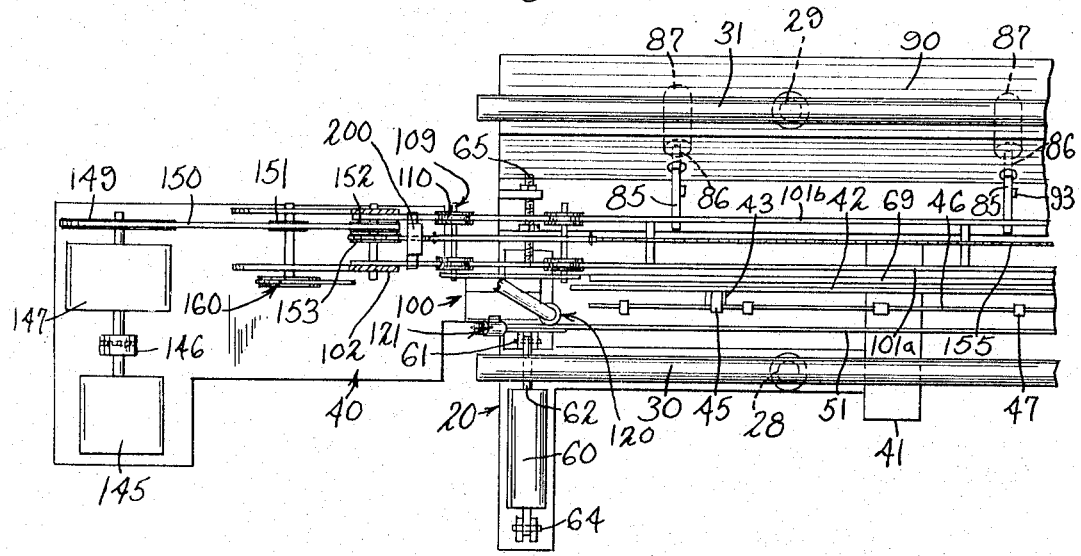
FIG. 3 is a sectional view taken along line 3—3 of FIG. 2.

Referring to FIG. 1, there is shown, for the purpose of illustrating the finished product, a wire cage 15 of mesh material which is formed into a cylindrical article suitable for use as a support or reinforcement in the formation of concrete pipe or the like. In particular, FIG. 1 shows a plurality of vertical wire strand free ends 16 and 17 positioned substantially parallel to each other and coupled together by welds 18. In this manner the wire mesh cage is rigidly formed with the requisite strength to meet the specifications of the concrete pipe industry.

Reference is now made to FIGS. 2–8 for a description of the apparatus for making the welds 18 shown in FIG. 1. The welding apparatus comprises a frame 20 coupled to a cross member 21 upon which there are mounted two cross members, one of which is shown at 22. Positioned on top of the cross bars 22 are receiving sleeves 24 and 25. These sleeves are adapted to receive slide rods 28 and 29 which have coupled at their ends guide entrance guide supports 30 and 31, respectively. These guide supports are adapted to receive a wire cage 15 for the welding operation and position it in the proper location with respect to the apparatus, such that the welding steps may take place. In order to provide a means for altering the position of guide supports 30 and 31 respectively, there are provided two preferably hydraulic cylinders 34 and 35 pivotally coupled to a cross bar 36 extending between the slide rods 28 and 29. The hydraulic cylinders 34 and 35 are coupled at their opposite ends to the frame 20. The guide supports 30 and 31 are elevated as shown in FIG. 5 in order to receive the cage 15 and permit it to be slidably positioned with respect to the remainder of the welding apparatus. After the cage is initially positioned, the guide supports are then lowered to set the cage 15 in a position such that the initiation of the clamping steps prior to the welding step may take place.

Referring in particular now to FIGS. 5, 6 and 7, there is shown a slidable frame 40 supported by a U-shaped member 41 coupled to frame 20. The top of this U-shaped member has a stop for preventing the upward movement of sliding frame 40, whereas the bottom portion of the U-shaped member supports the weight of the sliding frame 40. Positioned on the sliding frame is a plate 42 which cooperates with guides 43 to permit clamping means 45 to extend therethrough. Coupled to the clamping means is a rod bar 46 upon which there is mounted a plurality of additional clamping means 47, which are adapted to move simultaneously with the clamping means 45. These clamping means, 45 and 47, are utilized for clamping a cross strand of the wire in place against a surface during the welding operation. In order to position the clamping means 45 and 47, a pair of hydraulic cylinders 48 having piston rods 49, are provided. These cylinders are supported from the slidable frame 40 by a U-shaped support means 50. Extending from the frame 40 is a plate 51 positioned in such a manner as to support a portion of the wire cage 15 during the time the welding operation is taking place. The top edge of plate 51 provides a surface for the cage 15 to be pressed against by the clamping means 45.

Figure 4:
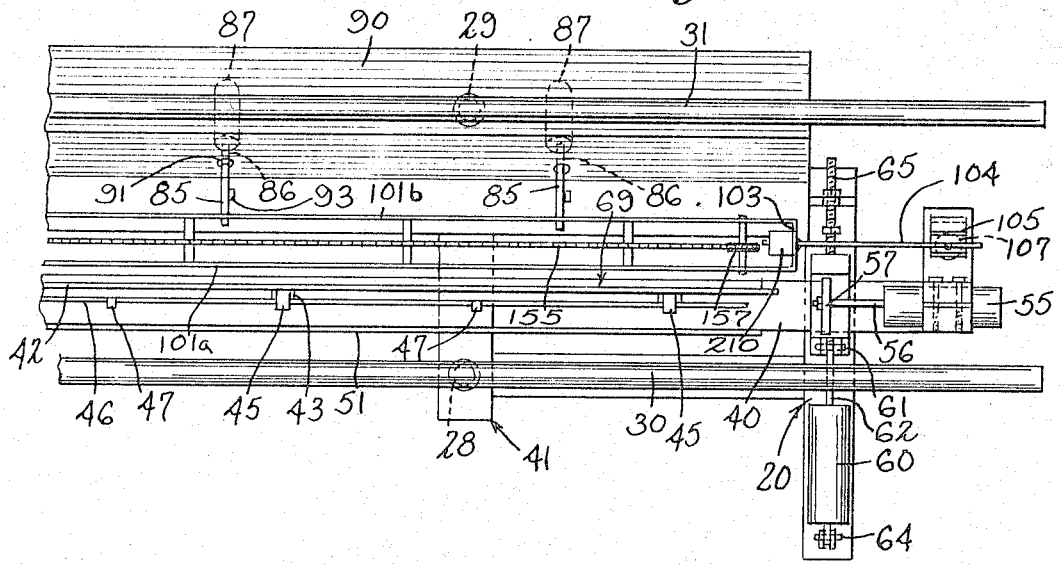
FIG. 4 is a top view taken along line 4—4 of FIG. 2.

In order to move the slidable frame 40 back and forth, there is provided, as shown in FIG. 4, a cylinder 55 supported by the frame 20 and having a piston rod 56 coupled at 57 to one end of the slidable frame 40. The slidable frame 40 is moved during the welding operation to insure that the ends of the wires are properly aligned. Two additional cylinders 60, preferably of the hydraulic type, are also provided for adjusting the position of the slidable plate so that wire of different mesh dimensions may be welded. These cylinders are coupled to the frame 20 at 61 and their pistons 62 are coupled to the frame 40 by a pin 64. The piston rods 62 are coupled such that the slidable frame is still free to move in a direction perpendicular to the direction of movement of the piston rods. The extent to which the frame 40 is positionable is limited by a set screw arrangement shown at 65. To adjust frame 40 and thereby reposition clamps 45 and 47, the cylinders 60 are actuated, thus moving the frame 40.

Referring now in particular to FIGS. 6, 7 and 8, there is shown a plate 69 having a friction or roughened surface 70. The plate 69 is supported on the frame 40 by a plurality of guide pins 72 mounted in a plurality of motion-limiting guide channels 73. A hydraulic or pneumatic cylinder 75 is preferably provided to position the plate 69 with respect to the frame 40. A piston rod 78 of the cylinder 75 is coupled to the plate 69 at 79 and the other end of the cylinder is coupled at 80 to the frame 40. Thus, by simultaneously actuating cylinders 55 and 75, the frame 40 and its plate 51 and the plate 69 and its edge 70 can be moved in opposite directions to align strands of wire forced against the surface of plate 51.

With reference now to FIGS. 3, 5 and 6, there is disclosed a plurality of clamping means 85 for positioning one side of the free ends of the vertical strands with respect to the opposite free ends of the same vertical strands which are maintained against plate 51 by the clamps 45 and 47. Furthermore, in situations wherein heavy wire is utilized, the clamps 85 may be maintained in clamped position during the entire welding operation in order to maintain the free ends of the vertical strands against the plate 51.

The clamps 85 are coupled to piston rods 86 of hydraulic cylinders 87. The cylinders are supported on a plate 90 extending from the frame 20. The plate 90 has a plurality of openings 91 so that a portion of the clamps 85 may move in a direction to either clamp or release a cross strand of the wire. Additionally, there are mounted on plate 90 in proximity to the clamping ends of the clamp 85, a plurality of pins 93. The pins 93 act to also position and restrain the ends of the vertical strand with respect to the edge of the plate 51. If desired, the pins 93 may be made adjustable on the plate 90 in order to taper the cage from end to end.

Referring now to FIGS. 2, 3, 5, 6 and 9, there is shown a welding mechanism 100 for sequentially and selectively sensing and welding vertical cross-stranded free ends together to form a wire mesh cage. This mechanism 100 includes two tracks, 101a and 101b which are supported at one end by a U-shaped member 102 coupled to the sliding frame 40. The pair of tracks 101a and 101b are coupled together at their other ends by a plate 103 from which there extends a member 104. To support this member, there is provided a guide bar 105 mounted on a piston rod 106 of a hydraulic cylinder 107. The hydraulic cylinder is itself supported on the sliding frame 40. The movable guide bar 105 is used to support the track during the welding operation, but is withdrawn to permit the removal or insertion of the cage after or prior to the welding step, as the case may be.

In order to support the device to weld the wire from the track there is provided a dolly arrangement 109 of eight wheels 110, four of which wheels are guided by one of the tracks 101b and four of the wheels are guided on the other of the tracks 101a.

There is coupled at the axis of the wheels 110 guided by track 101a, a pair of bracket-supported slide rods 112 and 113. Positioned between these slide rods is a member 115 which is slidable in a vertical plane to and from the plate 51. The member 115 acts as a supporting means for a pair of arms 116 and 117 and a plate 118 which provide support for a welding mechanism generally shown at 120 and a vertical strand free end sensing mechanism generally shown at 121. In this manner both the welding and sensing mechanisms 120 and 121 can ride up and down the slide rods in a vertical plane during the sensing and welding operation.

The welding mechanism 120 is supported from the plate 118 by a bracket 124. The welding mechanism 120 includes a gas pipe shown at 125 for providing a non-oxidizing gaseous medium in the vicinity of the strands to be welded. Positioned within the interior of the gas pipe there is provided a consumable metallic electrode which is coupled to a source of welding current and which, when in contact with the vertical cross strands produces a weld to join the strands together. This type of welding mechanism and the supporting apparatus for energizing the electrode and feeding the consumable electrode, is disclosed in U.S. Patent 2,504,868 issued April 18, 1950 in the name of Muller et al. This patent, by reference hereto, is incorporated as part of the disclosure of this application.

In order to selectively provide power to the consumable electrode of the welding mechanism 120 and to initiate the welding operation, there is provided a control switch shown at 130 which is actuated by the sensing mechanism 121. The sensing mechanism 121 includes a lift member 132 coupled to the plate 118 and a feeler mechanism 133. The feeler mechanism 133 includes a wire contact means 134 mounted on the end of a rod 135 movable within a frame 136. The end of the rod 135 is coupled to a member 138 which is positioned in such a manner as to selectively close the switch 130. Also coupled to member 138 is a piston rod 140 of a cylinder 141 mounted on the plate 118. The cylinder 141 which may be either hydraulic or pneumatic is utilized to raise the wire contact means 134 during the return of the welding and sensing mechanisms 120 and 121 to the starting position so that the tip of the contact means 134 will not catch the vertical strands already welded. In operation, the lift member 132 is raised by the presence of the wire strands until the contact means 134 is lifted to actuate the switch 130 to initiate the welding of the strands.

In order to move the dolly 109 carrying the welding and sensing mechanisms 120 and 121 up and down the tracks 101a and 101b, there is provided a hydraulic motor 145 mounted on the slidable frame 40. The motor 145 is coupled through a coupler 146 to a gear box 147, to which there is connected a pulley 149. A belt 150 is coupled over a drive pulley 151 to a drive sprocket 152. The sprocket 152 is mounted on the same shaft as a chain sprocket 153, both of which are supported on the slidable frame 40. Coupled to the sprocket 153 is a chain 155 which is coupled to the dolly 109. The chain 155 also extends over another chain sprocket 157 at the other end of the tracks 101a and 101b and returns to the sprocket 153. Thus, by the movement of the belt 150 the chain 155 will cause the dolly 109 to move along the tracks 101a and 101b. Additionally, the drive pulley 151 drives a pulley-belt arrangement, generally shown at 160. This pulley-belt arrangement is used to help move the gas pipe 125 along the track with the dolly 109.

With reference now to FIGS. 10 and 11, there is shown diagrammatically the steps involved in welding the vertical-stranded free ends 16 and 17 together in order to form the wire cage 15. In particular, FIG. 10 shows the clamps 45 and 47 forced against a cross strand 170 in order to press the vertical strand free ends 16 against the plate 51. Additionally, there is shown clamp 85 forced against a cross strand 171 in order to press vertical strand free ends 17 against the plate 51. In FIG. 11 there is shown the position of the ends 16 and 17 as a result of the movement of the plate 51 and the clamps 45 and 47 in one direction and the movement of the roughened surface 70 in an opposite direction. As can be observed, the ends 16 and 17 are now positioned substantially parallel to each other, such that the welding mechanism 120 can produce a weld 18 to join the ends together to form the wire cage 15. The roughened surface 70 acts frictionally against the strands 17 to align them as shown in FIG. 11. Thus there is provided a method and apparatus for welding the free ends of the same vertical strands together to automatically and sequentially form a wire cage.

Referring now to FIGS. 2 and 12, there is disclosed an electrical-pneumatic system suitable for controlling the cylinders 35, 55, 60, 87 and 141, respectively. To control these cylinders, the system of FIG. 12 is operated manually by the use of a foot pedal actuating a switch 180. To operate the cylinder 141, the system of FIG. 12 is automatically controlled by the action of the dolly 109 against a switch 200 positioned at the beginning of tracks 101a and 101b and by the action of the dolly 109 against a switch 210 positioned at the end of tracks 101a and 101b.

Since most of the cylinders are operated manually, the manual system will be described, but it is to be understood that the system is equally automatically operable.

The switch 180 is coupled to a solenoid 215 of a three-way valve 216. A valve of this type may be purchased from the Versa Corporation of Englewood, New Jersey. The input of the valve 216 is coupled to an air pump system 217 and the output of valve 216 is coupled to two pressure relief speed control valves 218 and 219 and to a cylinder 220 having a piston 221 and a piston rod 222. To move the piston rod 222 in one direction, the switch 180 is closed thereby energizing the solenoid 215. This forces air into the cylinder on one side of the piston 221 and permits air to exit from the other side of piston 221. To move the rod 222 in the other direction the switch 180 is opened. This deenergizes the solenoid 215 and permits the reverse movement of the pair in and out of the cylinder to occur.

Referring now to FIG. 13, there is disclosed a pneumatic-hydraulic system suitable for controlling the movement of the welding and sensing mechanism 120 and 121 up and down the tracks 101a and 101b. The system of FIG. 13 includes a hydraulic pump and supply system 250 for supplying hydraulic fluid under pressure to a four-part valve shown at 251. This valve may be purchased from The Wethersfield Company of Fort Wayne, Indiana, and is of the type capable of switching the flow of hydraulic fluid from one input port to any one of two output ports. The two output ports of the valve 251 are coupled to drive the hydraulic motor 145 in one of two directions, depending on the direction in which the hydraulic fluid is permitted to flow into the motor 145. Coupled to another of the input ports is a parallel system including a first manual speed adjust valve 261 in series with an on-off two-way valve 262 having a control solenoid 263 and a second manual speed adjust valve 271 in series with an on-off two-way valve 272 having a control solenoid 273. The two parallel paths are utilized to provide control of the flow speed of the hydraulic fluid to the motor. The adjust valve 261 is utilized to set the fluid speed in its path at a rate higher than the fluid speed through valve 272. These parallel paths are then coupled back to the pump and supply system 250 to complete the hydraulic circuit. Two rates of hydraulic flow are utilized in order to drive the motor at two speeds during the welding operation. The faster speed of operation is used to move the welding and sensing mechanisms 120 and 121 between the wire ends to be welded and the slow rate of fluid flow is used when the welding is taking place to insure there is sufficient time for a good weld to be made.

In order to automatically direct the hydraulic fluid between the two output ports of valve 251, there is provided a pneumatically driven cylinder 280 having a piston 281 and piston rod 282. The piston rod 282 is coupled to the normal manual position adjustment on the valve 251 to set it in one of two directions, thereby controlling the direction of fluid flow at the output ports of valve 251.

To actuate the cylinder 280, there is provided a four-way valve 290 having two control solenoids 291 and 292. Also coupled to this valve are two speed control exit valves 294 and 295. Further, there is provided to the valve 290 air under pressure from a suitable air pump 296. Thus, to operate valve 251, the solenoids 291 or 292, as the case may be, is energized, thereby permitting air to enter and exit to and from cylinder 280 in a manner to drive the piston 281.

Referring now to FIG. 14, there is shown in a schematic diagram, an electrical circuit for controlling the pneumatic-hydraulic system of FIG. 13 in order to operate the welding and sensing mechanisms 120 and 121. The circuit includes a pushbutton start switch 300 in series with a relay coil Rc and shunted by the normally closed, but held open, switch 200. Additionally, the pushbutton switch is coupled in series with the solenoid 291 in order to reverse the four-part valve 251 at the completion of the welding cycle. To control the welding time, a timer coil 310 is connected in series with the sensing unit switch 130 to control the application of power to the welding mechanism 120 through its contacts 311.

Considering now the operation of the apparatus described above and referring in particular to FIGS. 2, 3, 9–11, 13 and 14, the start pushbutton 300 is held down to permit current to flow through the relay coil Rc to close normally open relay contacts $Rc_1$, $Rc_2$ and $Rc_3$. The closing of contact $Rc_1$ opens the valve 262 to permit the hydraulic fluid to pass through the motor 145 at a high rate of speed and the closing of contact $Rc_2$ starts the pump system 250 to force fluid through the motor 145. Additionally, the closure of pushbutton 300 energizes the valve solenoid 291 to insure that the fluid is flowing into motor 145 in a direction to drive the dolly 109 down the tracks $101a$ and $101b$.

As the motor 145 starts to operate, the dolly 109 begins to move down the tracks $101a$ and $101b$ which then causes dolly 109 held open, but normally closed switch 200 to close, thus permitting the pushbutton 300 to be released. The coil Rc will remain energized through switch 200.

When the sensing contact means 134 rides up the wires 16 to a position to close normally open switch 130, the timer coil 310 is energized and a relay coil Rc is energized. This closes timer contact 311 thereby initiating the welding of wires 16 and 17. At the same time, normally closed contact $Rk_1$ is opened and normally open contact $Rk_2$ is closed, thus deenergizing the valve solenoid 263 and energizing the valve solenoid 273. In this manner, the welding mechanism 120 will now move across wires 16 and 17 at a slower speed to insure sufficient time to complete the weld 18. When the timed weld cycle is completed, the timer contact 311 will open, thereby preventing the welding mechanism from continuing to weld.

As the dolly 109 continues to move the sensing switch 130 will open, thus causing the fluid pumped into the motor 145 to once again be forced in at a higher speed. These steps of operation enumerated above continue until all the cross strands are welded and the dolly 109 reaches normally open switch 210.

At this time the solenoid 292 will be energized since contacts 210 are closed and the valve 251 will reverse the direction of flow of the fluid entering motor 145 to return the dolly to the starting position. Simultaneously, a solenoid 350 coupled to a three-way valve controlling cylinder 141 will be energized, thereby raising the feeler mechanism 133 during the return of the dolly 109. When the dolly 109 reaches the starting position, the switch 200 will open, thereby deenergizing the relay coil Rc and stopping the system.

It will thus be seen that the objects set forth above, among those made apparent from the preceding description, are efficiently attained and since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. Apparatus for welding a section of wire mesh together to form a cage, the section including a plurality of vertical strands each having a pair of free ends and a plurality of cross strands coupled to at least some of said vertical strands, and each of the free ends of the vertical strands extending a distance from one of said cross strands positioned nearest the tip of the free ends, said apparatus comprising in combination, means for aligning the free ends of the same vertical strands to contact each other and automatic means sequentially traveling across each pair of contacting free ends for sequentially welding the free ends of at least some of the same vertical strands together to form the cage, said means for welding including means for sensing the contacting free ends to initiate welding of the free ends.

2. Apparatus for welding a section of wire mesh together to form a cage, the section including a plurality of vertical strands each having a pair of free ends and a plurality of cross strands coupled to at least some of said vertical strands, and each of the free ends of said vertical strands extending a distance from one of said cross strands positioned nearest the tip of the free ends, said apparatus comprising in combination a surface, means for aligning the free ends of the same vertical strands to contact each other, and means for sequentially welding the free ends of at least some of the same vertical strands together to form the cage, said means for welding including means for rapidly moving the means for welding between pairs of contacting free ends and then slowly across contacting free ends while welding the free ends together.

3. Apparatus for welding a section of wire mesh together to form a cage, the section including a plurality of vertical strands each having a pair of free ends and a plurality of cross strands coupled to at least some of said vertical strands, and each of the free ends of said vertical strands extending a distance from one of said cross strands positioned nearest the tip of the free ends, said apparatus comprising in combination a surface, means for clamping the free ends on both sides of each of the cross strands against the surface to position the ends of the same cross strands with respect to each other, means for moving the free ends on one side of each of the vertical strands in a direction to contact the ends of the vertical strands on the other side of the vertical strands, and means for sequentially sensing the presence of a pair of free ends from the same vertical strands, and means responsive to said last-mentioned means for welding each of the sensed pair of free ends of the same vertical strands to form the cage.

4. A method of welding a section of wire mesh together to form a cage, the section including a plurality of vertical strands each having a pair of free ends and a plurality of cross strands coupled to at least some of said vertical strands, each of the free ends of said vertical strands extending a distance from one of said cross strands positioned nearest the tip of the free ends, the method comprising the steps of (a) initially positioning at least two cross strands in a predetermined position with respect to each other in order to place the free ends of one side of the vertical strands next to the free ends of the other side of the vertical strands such that the free ends of the same vertical strands are positioned adjacent to each other, (b) moving the free ends of at least one side of the vertical strands to bear against a surface such that the free ends will lie in substantially the same plane, (c) moving the free ends on the same vertical strand forward and into contact with each other in substantially parallel alignment over their contacting surfaces, and (d) sequentially sensing the presence of the adjacent free ends of the same vertical strand and welding the same free ends together after they are sensed.

5. A method of welding a section of wire mesh together to form a cage, the section including a plurality of vertical strands each having a pair of free ends and a plurality of cross strands coupled to at least some of said vertical strands, each of the free ends of said vertical strands extending a distance from one of said cross strands positioned nearest the tip of the free ends, the method comprising the steps of (a) positioning the free ends of one side of the vertical strands next to the free ends of the other side of the vertical strands, such that the free ends of the same vertical strand are positioned adjacent to each other, (b) moving the free ends of at least one side of the vertical strands to bear against a surface such that the free ends will be in substantially the same plane, (c) moving at least some of the free ends in a direction to insure that the adjacent free ends are bearing against each other over their contacting surfaces, and (d) sequentially welding at least some of the free ends of the same vertical strands together to form the cage.

6. A method of welding the free ends of the same wire mesh strand of a plurality of wire mesh strands together to form a wire mesh cage, comprising the steps of (a) positioning the free ends of the same strands in contact with each other and against a surface to parallelly align them in a plane in a side by side relationship, and (b) moving a welding mechanism rapidly between pairs of contacting free ends, sensing a free end and then slowly moving the welding mechanism across contacting free ends to sequentially weld together each of said ends in contact with each other.

References Cited

UNITED STATES PATENTS

| | | | |
|---|---|---|---|
| 1,972,530 | 9/1934 | Longoria | 219—117 |
| 2,893,664 | 7/1959 | Gerhauser | 140—112 X |
| 3,234,973 | 2/1966 | Adams | 140—71 X |

FOREIGN PATENTS

| | | |
|---|---|---|
| 465,767 | 5/1937 | Great Britain. |
| 92,106 | 4/1938 | Sweden. |
| 627,690 | 3/1936 | Germany. |

RICHARD M. WOOD, *Primary Examiner.*

ANTHONY BARTIS, *Examiner.*

B. A. STEIN, *Assistant Examiner.*